RELATIONSHIP BETWEEN THE INDICATED VALUES SHOWN BY A CALIBRATION DEVICE AND INDICATED VALUES OF STANDARD GAS

×—× CALIBRATION DEVICE. INDICATION VALUE
—— STANDARD GAS. INDICATION VALUE

RELATIONSHIP BETWEEN FLOW RATE AND OUTPUT SIGNAL CURRENT

RELATIONSHIP BETWEEN VERY LOW CONCENTRATIONS OF OXYGEN AND OUTPUT SIGNAL CURRENT

A. WINKLER METHOD 11.5 P.P.M.
B. WINKLER METHOD 4.85 P.P.M.

United States Patent Office 3,285,703
Patented Nov. 15, 1966

3,285,703
PHOTOSENSITIVE MEANS FOR DETERMINING TRACE OXYGEN BY MEASURING CHEMILUMINESCENCE
Yoshio Narita and Busuke Uzuki, Minato-ku, Tokyo, and Akio Tomimoto, Chigasaki, Kanagawa, Japan, assignors to Nippon Sanso Kabushiki Kaisha, Minato-ku, Tokyo, Japan, a corporation of Japan
Filed May 31, 1963, Ser. No. 284,639
5 Claims. (Cl. 23—254)

The present invention relates generally to apparatus for quantitatively analyzing traces of oxygen, and more particularly, to an apparatus that produces an electrical output signal directly proportional to the quantity of oxygen present and transmits such signal to a visual indicator.

The chemical reaction between phosphorus and oxygen is based upon the contacting of yellow phosphorus in vapor form and trace oxygen. This reaction is expressed by the empirical formula $$P_4 + 3 \cdot O_2 = 2P_2 \cdot O_3$$

Yellow phosphorus vapor must be generated by either solid yellow phosphorus or liquid yellow phosphorus, for the trace oxygen cannot be combined with the phosphorus when it is in either of these two states. The choice of whether the solid or the liquid phosphorus is to be used as a source for supplying phosphorus vapor will be determined by the concentration of trace oxygen to be analyzed, although reference is made hereinafter only to solid phosphorus for illustrative purposes.

Solid phosphorus has a vapor pressure of 0.025 mm. Hg at 20° C. When it is saturated under atmospheric pressure, vapor from the solid yellow phosphorus is present in the proportion of 33.3 parts per million. Since each molecule of phosphorus vapor reacts with three molecules of oxygen, as expressed by the equation above, oxygen will be present in the proportion of 100 parts per million. The reaction between the phosphorus vapor, which is very active chemically, and the oxygen produces a luminous glow as the phosphorous oxide reaction product is formed. The luminosity of this glow is directly proportional to the amount of oxygen present.

Accordingly, it is an object of the present invention to provide an analyzer dependent upon the chemical interaction of phosphorus and minute quantities of oxygen.

An object of the present invention is to provide an analyzer that functions accurately and rapidly to measure oxygen concentrations as small as 1 part per billion.

Another object is to provide an indicator that has a plurality of selectively operable scales, whereby various concentrations of oxygen can be analyzed with the same apparatus.

Another object is to simplify calibrating operations for the analyzer apparatus.

Another object is to provide a protective mechanism to prevent the highly corrosive phosphorus from attacking the analyzer.

In accordance with the present invention, an analyzer is constructed with a reaction chamber for mixing phosphorus and oxygen, the chamber having a transparent wall, a photomultiplier positioned adjacent to the transparent wall for detecting the luminous rays emanating from the reaction chamber, and converting such rays into an electrical current, and an indicator connected to the photomultiplier for providing a visual indication representative of the intensity of the rays produced in the reaction chamber.

Further objects and advantages will become apparent to the skilled artisan from a perusal of the specification when construed in accordance with the drawing, in which.

Figure 1:
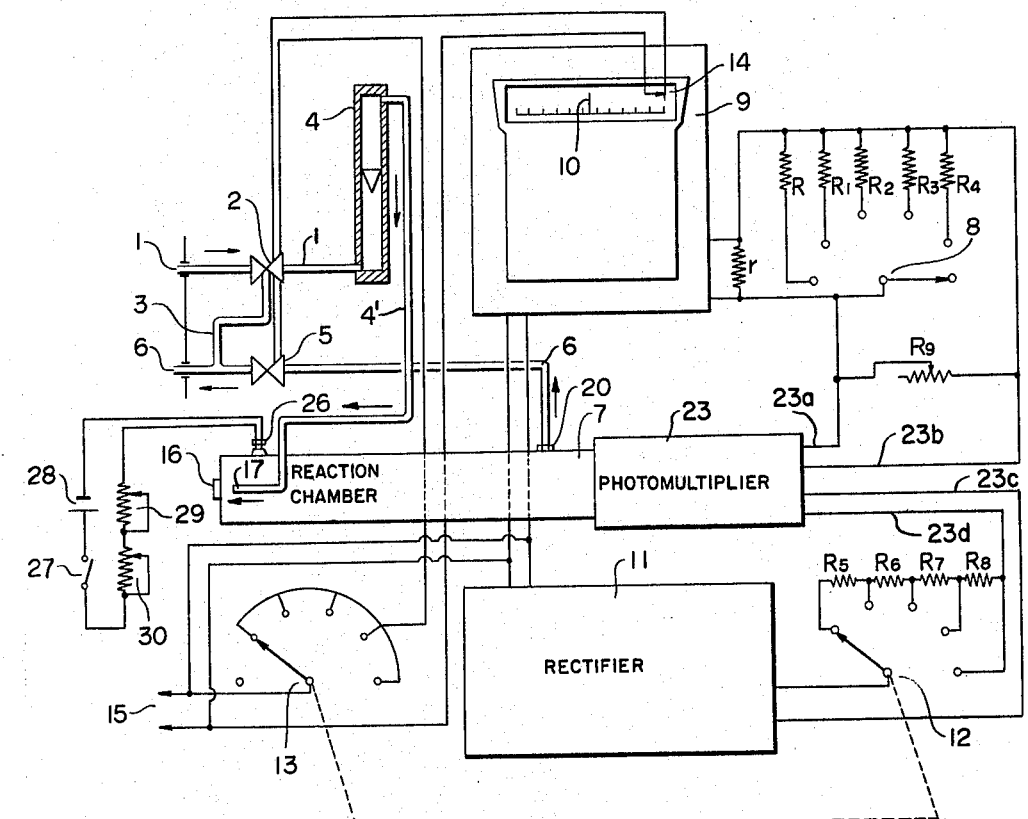
FIG. 1 is a schematic view of an analyzer constructed in accordance with the principles of this invention.

Referring to FIG. 1, reference numeral 1 identifies the inlet pipe for the analyzer, and the direction of flow is represented by the directional arrow next to pipe 1. A three-way solenoid valve 2 is downstream of the inlet for pipe 1.

Pipe 3, which communicates with valve 2, is provided for purging purposes. Flow meter 4 is located downstream of valve 2. A two-way solenoid valve 5 is located in outlet conduit 6. Reaction chamber 7 communicates with flow meter 4 over conduit 4' to receive the gas to be analyzed, and the gaseous end product of the chemical reaction is exhausted over outlet conduit 6.

Figure 2:
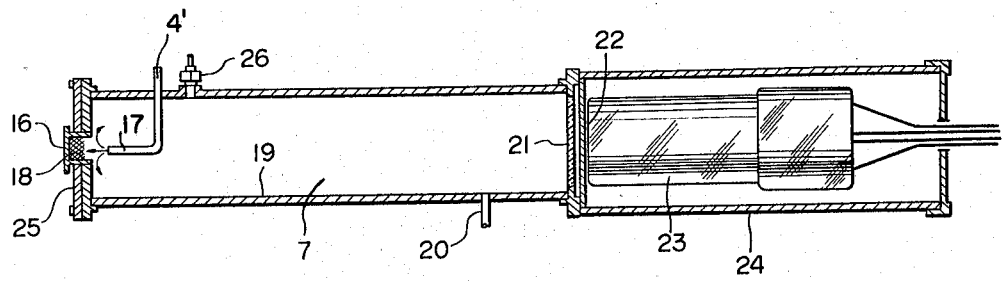
FIG. 2 is a plan view of the reaction chamber and the photomultiplier.

FIG. 2 shows the configuration of reaction chamber 7. Chamber 7 has a receptacle 16 at the midpoint of one end wall for retaining solid phosphorus 18 therein. Conduit 4' extends through an aperture in the upper wall 19' of the chamber and terminates in a nozzle 17 facing receptacle 16. An exhaust pipe 20 extends through the bottom wall 19 of chamber 7. A glass plate 21 defines the end of the chamber opposite receptacle 16. The remainder of the end wall 25, which is adjacent to receptacle 16, has a highly polished reflecting surface.

A detection chamber 24, which is impervious to light on three sides, has a photomultiplier positioned adjacent to end wall 21 of chamber 7. The light energy falling upon light responsive surface 22 is converted into a proportional electric current by photomultiplier tube 23, which is of conventional design.

The output signal from tube 23 is fed into two circuits, as seen in FIG. 1. Output leads 23a and 23b are the input and return leads for the range selector circuit, which includes indicator 9 and range selector 8.

Range selector 8 may be a manually adjustable switch that selectively brings resistors R, $R_1$, $R_2$, $R_3$ or $R_4$ into the selector circuit. For example these resistances are selected to represent ranges of 0–50 p.p.m.; 0–20 parts per million; 0–1 parts per million, and 0–100 parts per billion. The current that passes through the selected resistors actuates pointer 10 and moves same across the dial face of indicator 9. It is understood that these resistances are actually disposed within the housing for indicator 9.

Output leads 23c and 23d are the input and return leads for a protective circuit for the analyzer seen in FIG. 1. Such circuit includes switches 12 and 13, which are linked together for joint movement. Switch 12 controls the direct current voltage supply for solenoid valves 2 and 5 by being selectively engaged with resistances $R_5$–$R_8$. A.C. power source 15 is converted to D.C. operation by a conventional rectifier 11, such as a diode bridge circuit. A limit switch 14 is provided at the end of the path of travel for pointer 10 across the dial of indicator 9. Switch 14 is connected in series with the leads from the power source to valves 2 and 5 to break the circuit under certain conditions.

A calibration circuit is also provided for the analyzer. Such circuit includes battery 28, normally open switch 27, variable resistances 29 and 30, and bulb 26. Bulb 26 is mounted atop reaction chamber 7.

The above described analyzer apparatus functions in the following manner. The gas to be analyzed is introduced via inlet 1 from a source (not shown). Valves 2 and 5 are adjusted to their open position so that the gas flows into flow meter 4 and over conduit 4' and is discharged through nozzle 17 into chamber 7. Prior to actual measurement, the analyzer is purged by connecting three-way valve 2 to exhaust pipes 3 and outlet pipe 6.

As seen in FIG. 2, the gas is directed against solid yellow phosphorus 18 held in receptacle 16. Any oxygen molecule present will readily combine with the vapor emitted by the phosphorus, and the oxidation of the phosphorus vapor will give rise to a luminous emission within reaction chamber 7. Pipe 20, which is connected to outlet pipe 6, exhaust the gas from the chamber through valve 5.

The luminous emissions within chamber 7 actuate photomultiplier tube 23 by direct transmission through glass 21 and by indirect reflection from end wall 25. The emissions falling upon surface 22 are converted into electrical current by photomultiplier 23 and are transmitted by leads 23a, 23b, 23c and 23d to the range selector circuits and to the protective circuit.

Range selector 8 is manually set to a desired range or span upon the face of indicator 9 by selectively engaging resistances R, $R_1$, $R_2$, $R_3$ or $R_4$. The intensity of the light falling upon surface 22 from the oxidation taking place in reaction chamber 7, is proportional to the current (in microamps) that move pointer 10 across the dial face of indicator 9. If the concentration of oxygen in the sample gas causes the generation of a current that exceeds the range chosen by selector 8, then the pointer will swing full scale and open normally closed protective switch 14. The opening of switch 14 breaks the circuit from power source 15 and rectifier 11 to thereby cut-off the power supply for three-way solenoid valve 2 and two-way solenoid valve 5. With these valves in closed position, any gas flowing over inlet pipe 1 will be exhausted over outlet pipe 6 by way of purge pipe 3. Switch 14 prevents the analyzer from being attacked by the highly corrosive phosphorus resulting from an imperfect purge or from an accumulation of impure gas with a high oxygen content.

When a higher range for indicator 9 has been chosen by adjustment of selector 8, then switches 12 and 13 are accordingly adjusted to alter the voltage supplied to the indicator by selectively bringing resistances $R_5$, $R_6$, $R_7$ and $R_8$ into the circuit leading to valves 2 and 5. When the voltage supply has been properly adjusted, then current is supplied to valves 2 and 5 to open same and allow the gas to be analyzed to flow into chamber 7.

Figure 3:
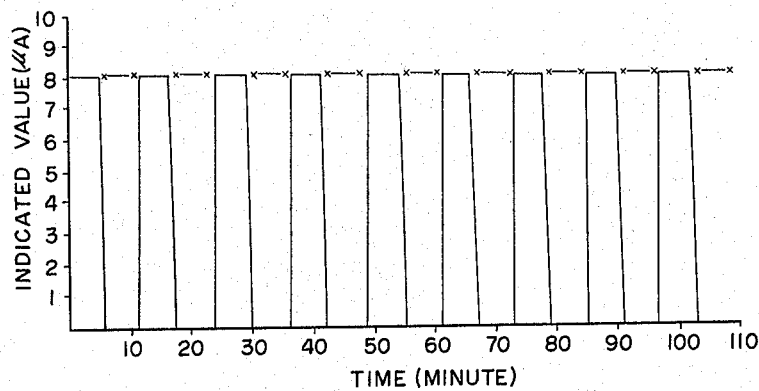
FIG. 3 is a graph of current vs. time showing the relationship between the values obtained by a calibration device and theoretically obtained values.

The analyzer can be calibrated by employing a known gas sample, as in conventional practice. However, the analyzer can also be effectively calibrated by visual inspection. First, a bulb 26 of predetermined luminosity is selected, and then the gas sample is passed into chamber 7 wherein the chemical reaction occurs with the accompanying luminous emissions. Normally open switch 27 is closed, and the comparison circuit including battery 28 and variable resistors 29 and 30 is connected to bulb 26. By selective movement of variable resistor $R_9$, the reading of the luminosity of the chemical reaction in chamber 7 and the reading of the luminosity of bulb 26 are brought into coincidence. The graph of FIG. 3 shows the almost exact coincidence of test results obtained by calibration using known gas samples and by using bulb 26 and the above described comparison procedures.

Figure 4:
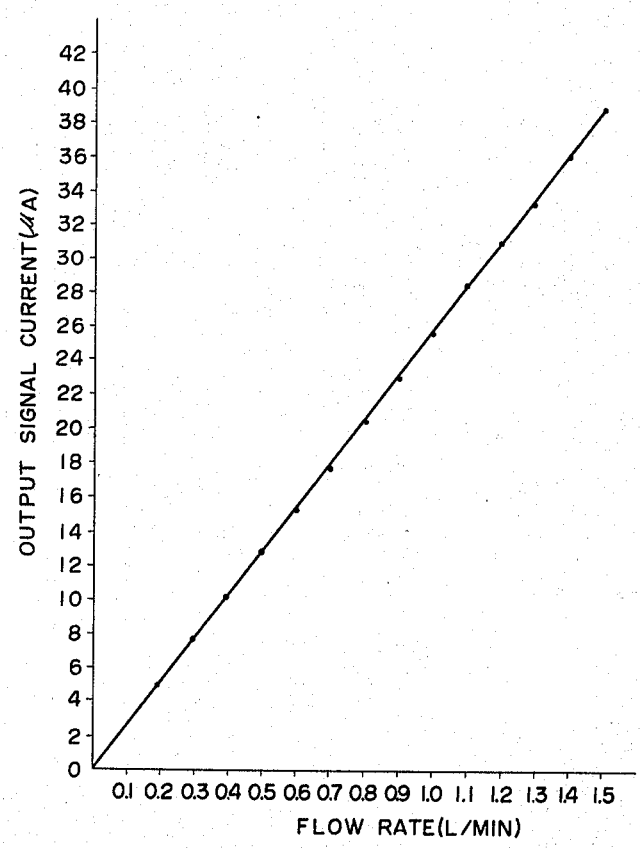
FIG. 4 is a graph of output signal current A vs. flow rate in the reaction chamber.

The relationship between the flow rate and the output signal current from photomultiplier 23 is linear in nature, as shown in FIG. 4, and therefore the sensitivity of the analyzer can be controlled by varying the flow rate by adjustment of flow meter 4 and valve 2. Accordingly, when a high flow rate is utilized, then the sensitivity of the analyzer is increased so that a quantitative analysis of trace oxygen below 1 part per billion is possible. Such extreme sensitivity can not be achieved with conventional analyzers.

Figure 5:
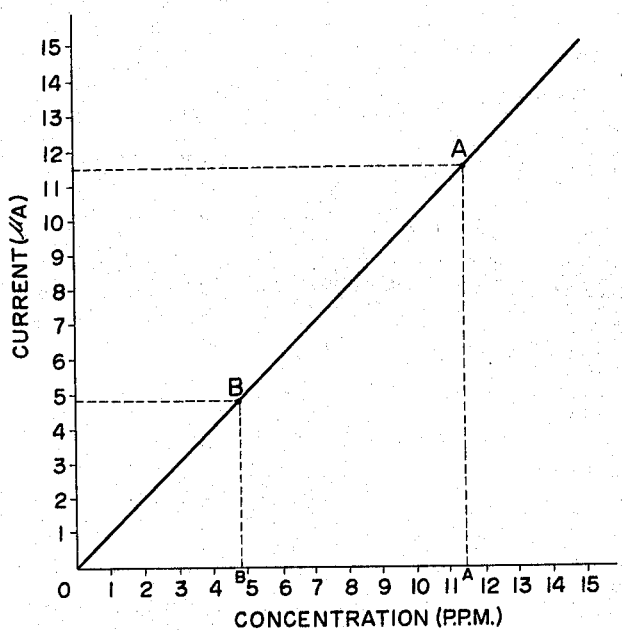
FIG. 5 is a graph of output signal current vs. concentration of oxygen in the reaction chamber.

The relationship between trace oxygen and the output signal current is shown in FIG. 5. The proportionality between the output signal current and the trace oxygen is constant; and the analyzer responds rapidly to the presence of any trace oxygen in the gas sample.

Furthermore, the analyzer does not have to be calibrated with a gas sample free of oxygen, for the output signal surrent will invariably drop to zero when the input flow of gas is terminated. This property is of extreme importance when handling gas samples containing minute traces of oxygen in the range below 1 part per million.

It should also be noted that the response time for the analyzer is extremely rapid, for both the chemical reaction and the emission of light rays are almost instantaneous in nature. Such analyzer, in view of the above described features, has made feasible the rapid and efficient testing of trace oxygen in concentrations that had previously been impossible to quantitively analyze.

It is intended that the appended claims be broadly construed commensurate with the advance in the arts and sciences achieved by the above described invention.

What we claim is:

1. Analyzer apparatus for quantitatively measuring trace oxygen comprising, controllable inlet means for selectively supplying a gas sample including trace oxygen, a reaction chamber connected to said inlet means, outlet means for exhausting said chamber, phosphorus source means for releasing phosphorus vapor into said chamber to contact the gas sample and chemically react therewith to release light emissions, photomultiplier means disposed adjacent to said chamber to receive the light emissions from the chemical reaction, said photomultiplier means converting the light emissions into an electrical output signal, electrical indicator means connected to said photomultiplier means to produce an indication related to the intensity of the light emissions within said chamber.

2. The analyzer apparatus as claimed in claim 1 wherein said phosphorus source means consists of a receptacle within said chamber and a piece of solid phosphorus disposed therein, and said inlet means terminates in a nozzle disposed adjacent to said receptacle.

3. The analyzer apparatus as claimed in claim 1 wherein said reaction chamber consists of a pair of end walls and a body portion extending therebetween, one end wall acting as a reflecting surface, and the other end wall being transparent to transmit light to said photomultiplier means.

4. The analyzer apparatus as claimed in claim 1 wherein said electrical indicator means comprises a pointer, a graduated dial face, and a limit switch conected to said inlet means, said pointer being moved across said dial face by the electrical output signal from said multiplier until said pointer contacts said limit switch and disables said inlet means.

5. The analyzer apparatus as claimed in claim 1 further including calibration circuit means, said calibration means comprising a bulb attached to said chamber, a power source for lighting said bulb and a variable resistance for changing the intensity of said bulb.

References Cited by the Examiner

UNITED STATES PATENTS

| 1,948,635 | 2/1934 | Sykes | 250—211 X |
| 2,664,779 | 1/1954 | White | 73—23 X |
| 3,194,110 | 7/1965 | Eppig et al. | 23—232 X |

OTHER REFERENCES

Mellor: Comprehensive Treatise on Inorganic and Theoretical Chemistry; vol. 8, 1928, pp. 771–782.

Goldenson, J., Detection of Nerve Gases by Chemiluminescence, Analytical Chemistry, vol. 29, No. 6, June 1957, pp. 877–879.

WALTER STOLWEIN, *Primary Examiner.*